UNITED STATES PATENT OFFICE.

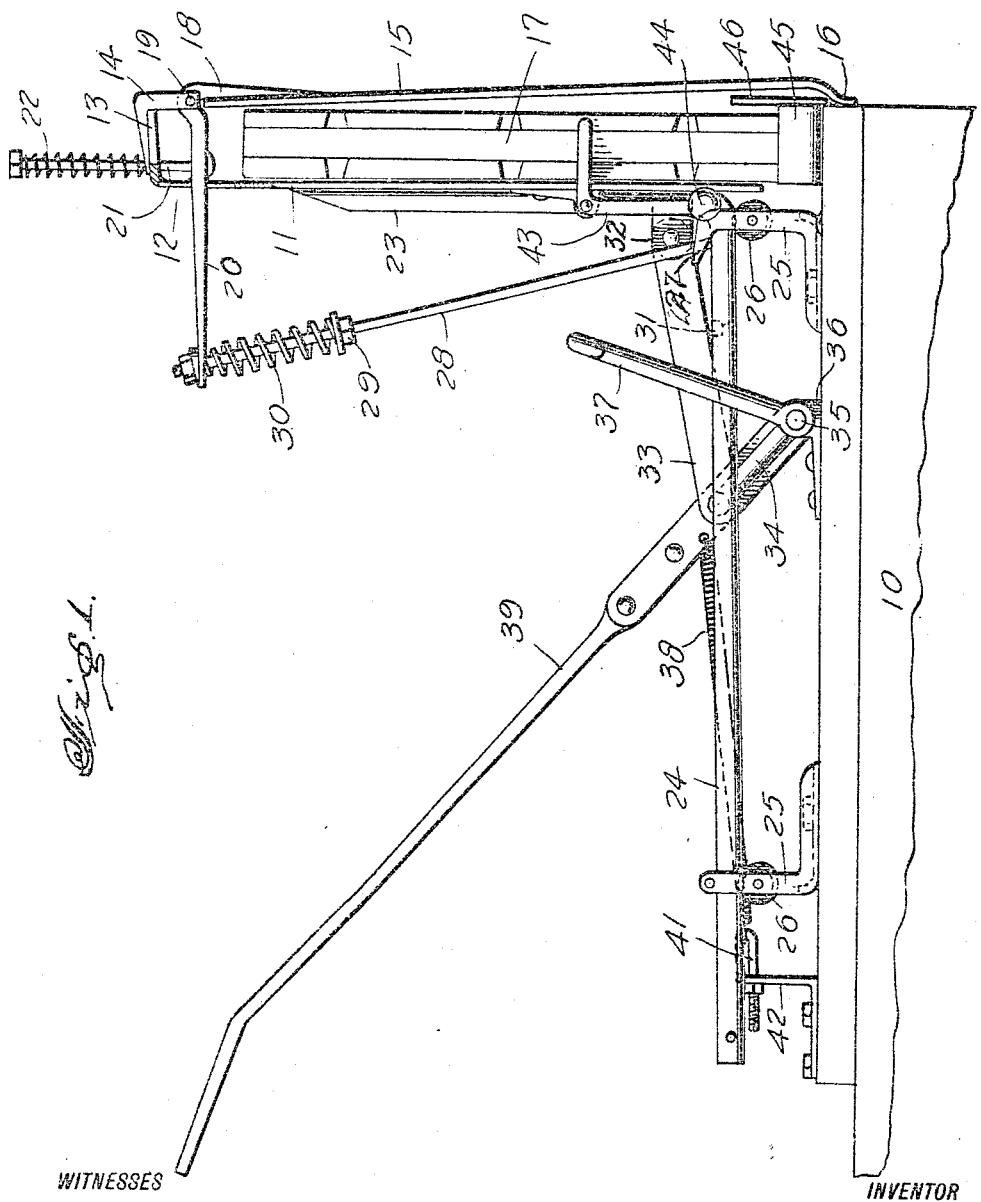

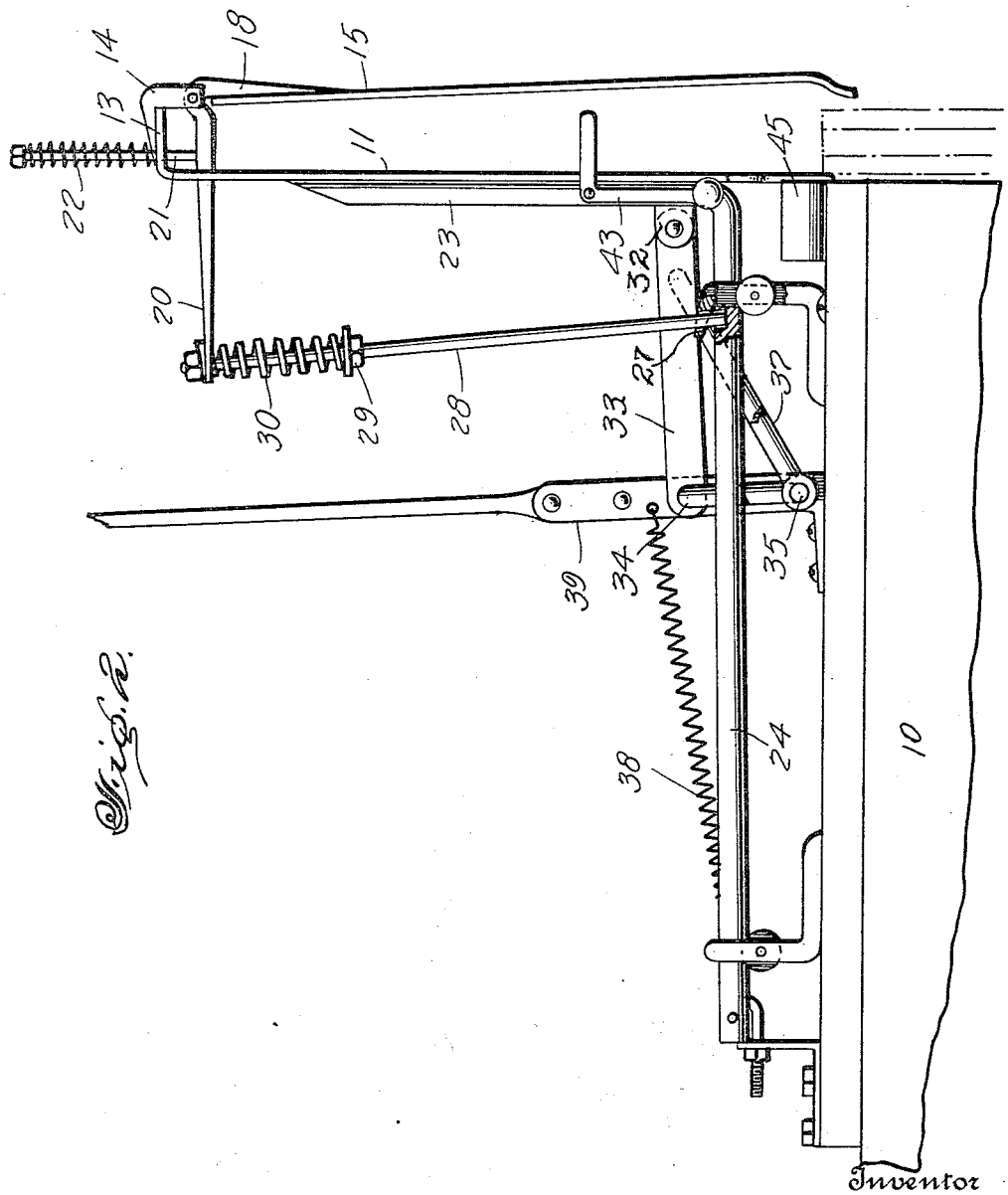

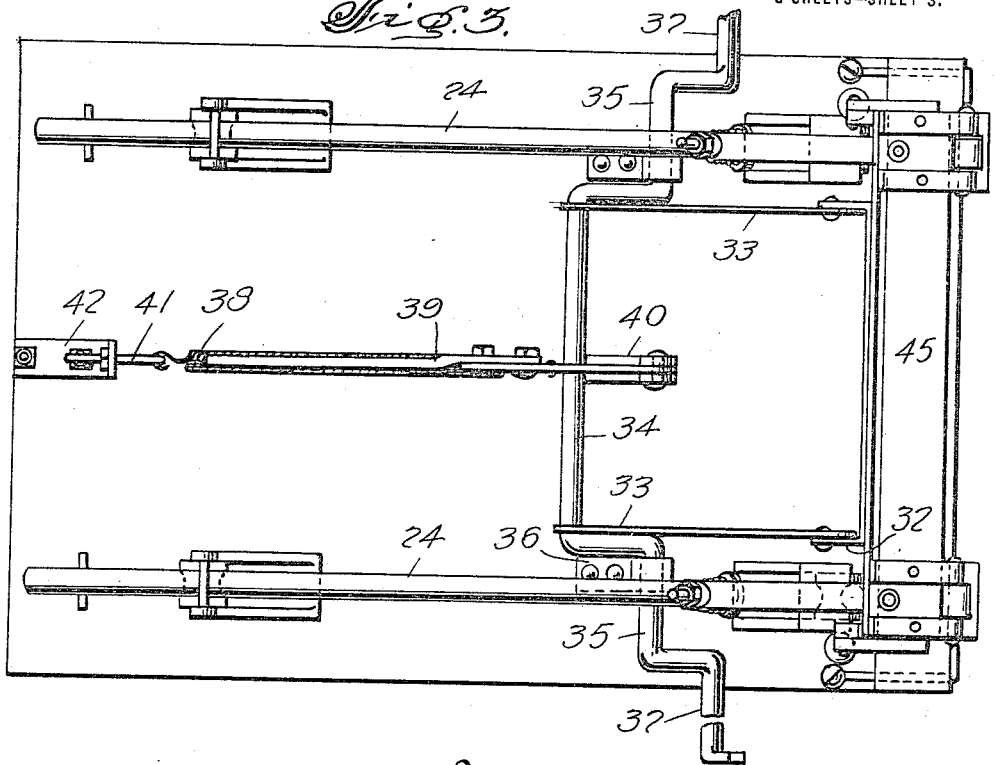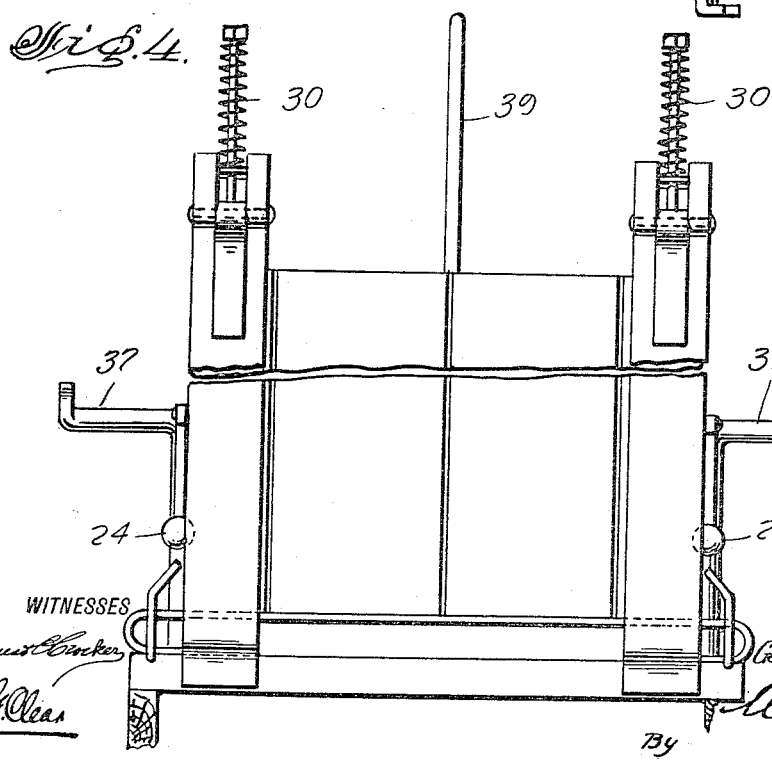

GEORGE CALVAN MUMMA, OF DECATUR, INDIANA.

AUTOMATIC BLOCK-DROPPER.

1,244,360.

Specification of Letters Patent.

Patented Oct. 23, 1917.

Application filed June 7, 1917. Serial No. 173,316.

*To all whom it may concern:*

Be it known that I, GEORGE C. MUMMA, a citizen of the United States, and a resident of Decatur, in the county of Adams and State of Indiana, have invented a certain new and useful Improvement in Automatic Block-Droppers, of which the following is a specification.

My present invention relates generally to baling presses, and more particularly to means for dropping the head blocks into the baling chamber, and resides in the construction, arrangement, and operation of the automatically acting parts to be presently described, wherein the objects of my invention, together with the advantages resulting therefrom, may be readily understood.

In the accompanying drawings illustrating my invention and referred to in the description to follow:

Figure 1 is a side elevation of the parts constituting my invention with the carriage in retracted position subsequent to the introduction of a block head therein;

Fig. 2 is a similar view, certain of the parts being broken away and in section, showing the carriage in forward operative position just subsequent to the release of the head block;

Fig. 3 is a plan view of the parts as seen in Fig. 1, and

Fig. 4 is a front elevation.

Referring now to these figures, my improved block dropper includes a carriage movable horizontally above and upon the top of a baling press, a portion of which is indicated at 10 in the several figures, adjacent to the feed opening, said carriage comprising a pair of rigidly connected and laterally spaced upright arms 11 having vertically slotted openings 12 adjacent their upper ends, and having forwardly bent upper angular extremities 13 to which are secured pairs of depending elbows 14.

Opposite to the rear extremities 11 is a pair of movable forward arms 15, the lower extremities 16 of which are offset below the lower ends of the rear arms so as to extend beneath the lower edge of the head block 17 when the carriage is moved forwardly to the position shown in Fig. 2, the upper ends of the movable forward arms 15 of the carriage being secured to angular levers 18 intermediately pivoted by pivot pins 19 extending through the elbows 14 before referred to, with their rear extensions 20 projecting rearwardly through the upper slots 12 of the rear rigid arms 11 of the carriage, the said extensions 20 of the levers 18 being controlled by bolts 21 projecting upwardly through openings in the upper extensions 13 of the rear rigid arms 11 and provided with springs 22 which normally tend to elevate the extensions 20 of levers 18 and thus move the arms 15 upon the pivots 19 and toward the rear arms 11.

The forward bearing members 25 have upper angular portions 27 provided with openings through which the lower ends of a pair of upright latch bars 28 extend, the upper ends of these latch bars extending through openings in the rear ends of the extensions 20 of the levers 18 and have intermediate collars and the like 29 with springs 30 coiled thereabout and bearing between the collars 29 and the lower surfaces of the lever extensions 20 so as to normally exert a downward thrust upon the latch rods 28, to receive the lower ends of which latch rods, the slide bars 24 have intermediate openings 31.

The rear rigid arms 11 of the carriage are rigidly connected and have rearwardly projecting ears 32 to which are pivotally connected the forward ends of a pair of connecting bars 33, the rear ends of which are journaled upon the intermediate crank portion 34 of a transverse shaft 35 mounted parallel to the carriage and at the rear thereof in bearings 36 secured to the top of the baling press 10, the opposite extremities of the shaft 35 having upwardly projecting cranks 37 constituting foot levers, by depression of which in a forward direction, the carriage is thrust forwardly from its rear position, as shown in Fig. 1, to its forward position above the feed opening of the press, as seen in Fig. 2, against the tension of a spring 38 engaging at its forward end the hand lever 39 by means of which the carriage may be thrust forwardly if so desired. This hand lever is pivoted at its lower end to a bearing 40 secured to the top of the baling press and has an intermediate opening through which the central crank portion 34 of the shaft 35 extends, and the rear end of the spring 38 is engaged by a hook bolt 41 adjustably mounted in connection with a bracket 42 secured to the top of the press whereby the tension of the spring 38 may be regulated.

Intermediately pivoted at the outer sides of the two rear uprights 11 of the carriage is a pair of angular controlling dogs 43 having their vertically projecting arms provided with weights 44 whereby to normally maintain their horizontal arms transversely of, and toward the sides of the carriage so as to prevent accidental lateral displacement of the head block 17 after it is placed in the carriage, as seen in Fig. 1, it being noted that the carriage so constructed is open at both sides for the introduction of the head block between the forward and rear upright arms from either side of the carriage.

Secured upon the top of the baling press 10 is a transverse bar 45 lying beneath the carriage in the rearmost position of the latter as shown in Fig. 1, to form a rest for the head block in its angular position, and forwardly beyond the said bar 45 and at opposite sides of the carriage upstand a pair of safety stop arms 46 which engage the head block and prevent forward movement of the carriage, unless the head block is in proper laterally adjusted position, the stop arms 46 being rigid for this purpose.

Thus, with the carriage in its rearmost position, as shown in Fig. 1, it is simply necessary to rock one of the dogs 43 in order to slip the head block 17 into the carriage from either side thereof, the dog when released falling to its normal position as shown in the figure mentioned when the head block is shifted to proper position. Should the operator carelessly leave the head block extended at one side or the other beyond the carriage, one of the stop arms 46 at the respective side will check the forward movement of the carriage until the head block has been shifted to proper position.

When the carriage is to be shifted forwardly to proper position, either the hand lever 39 may be utilized or one of the foot levers 37, pressure upon either of which will force the carriage forwardly against the tension of spring 38 until the openings 31 of the slide bars 24 aline beneath and receive the lower ends of the latch rods 28, which latter are pressed down by their springs 30, the angular lever extensions 20 being at this time in lowermost position by virtue of the spaced relation of the forward arms 15 of the carriage with the head block in position.

The head block is thus disposed above the feed opening of the press with the carriage in a forward position, as shown in Fig. 2, and is in position for engagement by the usual grass hopper to lower the same into the press, in which movement it slides down between the forward and rear arms of the carriage, when the head block is completely free of the carriage. The forward arms 15 are moved toward the rear arms 11 by virtue of the springs 22 engaging bolts 21 to rock the levers 18, this movement elevating the lever extensions 20 so as to cause the latter to lift the latch bars 28 to released position and free the carriage for rearward sliding retractile movement under tension of the spring 38.

It is obvious that, except for the introduction of the head block into the carriage, and the movement of the carriage to its forward operative position, the several operations of my improvement are entirely automatic and that, by virtue of the latching of the carriage in its forward operative position, all necessity of its being held in this position by the operator is avoided, leaving the operator the full use of both hands to feed with during the baling operation.

It will be noted, furthermore, that during the downward movement of the head block the forward arms 15 are yieldable at all times, this avoiding the absolute necessity of a straight drop which the presence of any hay in the feed opening will prevent, and with my improvement the block in its dropping movement may be shifted to avoid the presence of hay in the feed opening and continue its downward movement at the same time.

I claim:

1. In a block dropper, the combination of a horizontally movable carriage having yielding spring controlled arms at its forward portion for engagement with the head block, and open at its opposite sides for introduction of the head block, said carriage including latch bars, means for shifting the carriage forwardly, means controlled by the yielding arms of the carriage and engageable with said latch bars to lock the carriage in its forward operative position, and means for returning the carriage to its rear inoperative position when the latching means are released.

2. A block dropper of the character described, comprising a carriage movable horizontally, and including forward arms yieldingly supported and pivoted adjacent their upper ends, means for shifting the carriage forwardly to operative position, means for latching the carriage in its forward operative position, said means being controlled by and releasable upon rearward movement of the forward arms of the carriage, and means for automatically returning the carriage to its rear inoperative position when said latching means are released.

3. In a block dropper of the character described, a horizontally shiftable carriage open at its opposite sides for the reception of a head block at either side, a pair of angularly disposed dogs intermediately pivoted at opposite sides of the carriage and each having one arm provided with a weight to normally maintain the other arm thereof across the adjacent open side of the carriage, means for shifting the carriage forwardly to its operative position, and a spring for returning the carriage to inoperative position after the block has been dropped.

4. In a block dropper, a horizontally shiftable carriage open at its sides for the introduction of a head block from either side thereof, means to position the head block in laterally adjusted relation within the carriage, to prevent accidental displacement thereof, a rest bar positioned below the carriage in the rear inoperative position of the latter, and onto which a head block is slidable upon its inward movement within the carriage, and a pair of stop arms projecting above the rest bar forwardly of and adjacent opposite sides of the carriage, whereby to prevent forward movement of the carriage to operative position when the head block is laterally displaced.

5. In a block dropper of the character described, a horizontally shiftable carriage having rearwardly projecting slide bars and forwardly depending and hingedly mounted arms, vertically extending latch rods engageable with portions of said slide bars to latch the carriage in its forward operative position, extensions carried by the said front arms, having controlling springs and engaging and controlling the said latch rods, means for shifting the carriage forwardly to operative position, and means for returning the carriage to its rear operative position upon release of said latch rods.

6. In a block dropper of the character described, a horizontally shiftable carriage having rearwardly projecting slide bars and forwardly and hingedly mounted arms, vertically extending latch rods engageable with portions of said slide bars to latch the carriage in its forward operative position, extensions carried by said front arms, having controlling springs and engaging and controlling said latch rods, means for shifting the carriage forwardly to operative position, including a shaft journaled adjacent to the carriage, having an intermediate crank portion operatively connected to the carriage, and end cranks forming foot levers at the opposite ends thereof, and a spring having connection with the intermediate crank portion of the shaft for returning the carriage in its rear inoperative position upon release of the said latch rods.

7. In a block dropper of the character described, a carriage including opposing forward and rear arms, and slide bars rigidly connected to the rear arms, the upper ends of said rear arms having forward extensions, levers intermediately pivoted to the extensions of the rear arms, said levers being secured at one end to the upper portions of the forward arms to hingedly mount the latter for movement toward and away from the rear arms, the opposite ends of said levers projecting rearwardly beyond the rear arms, said slide bars having apertures, vertically extending latch rods, the lower ends of which are movable into the apertures of the slide bars in the forward operative position of the carriage, and the upper ends of which latch bars are connected to and controlled by the rear ends of said levers, means for moving the carriage forwardly to operative position, means for moving the carriage rearwardly to inoperative position when the latch rods are released, and springs for moving the said forward arms toward the rear arms of the carriage whereby to elevate the latch rods to released position.

8. In a block dropper, a horizontally sliding carriage including forward and rear arms between which a block may be disposed, and rearwardly extending slide bars secured to the said rear arms and provided with apertures intermediate their ends, levers secured to the upper portions of the front arms and intermediately pivoted to portions of the rear arms of the carriage, bearings in which the slide bars are adjustable, certain of which have guide openings, latch rods having their lower ends extending through the guide openings for extension within the apertures of the slide bars when the carriage is in forward operative position, said latch rods being connected to and controlled by said pivoted levers and attached to the front arms, means for manually shifting the carriage forwardly to operative position, and spring means for returning the carriage in its rear inoperative position when the latch rods are released.

GEORGE CALVAN MUMMA.

Copies of this patent may be obtained for five cents each, by addressing the "Commissioner of Patents, Washington, D. C."